United States Patent
Mihara

[11] Patent Number: 5,808,810
[45] Date of Patent: Sep. 15, 1998

[54] COMPACT REAR FOCUSING ZOOM LENS SYSTEM

[75] Inventor: Shinichi Mihara, Tama, Japan

[73] Assignee: Olympus Optical Co., Ltd., Tokyo, Japan

[21] Appl. No.: 550,832

[22] Filed: Oct. 31, 1995

[30] Foreign Application Priority Data

Oct. 31, 1994 [JP] Japan .................................. 6-266659

[51] Int. Cl.$^6$ .............................. G02B 15/14; G02B 3/02
[52] U.S. Cl. .......................... 359/690; 359/684; 359/708
[58] Field of Search .................................... 359/684, 686, 359/687, 690, 708

[56] References Cited

U.S. PATENT DOCUMENTS

| | | | |
|---|---|---|---|
| 4,906,079 | 3/1990 | Mihara et al. | 359/652 |
| 5,168,402 | 12/1992 | Mihara | 359/684 |
| 5,260,834 | 11/1993 | Shibata et al. | 359/690 |
| 5,268,793 | 12/1993 | Saka et al. | 359/690 |
| 5,543,970 | 8/1996 | Hata et al. | 359/690 |

FOREIGN PATENT DOCUMENTS

| | | |
|---|---|---|
| 6-027377 | 2/1994 | Japan . |
| 6-138390 | 5/1994 | Japan . |
| 6-258577 | 9/1994 | Japan . |

Primary Examiner—Georgia Y. Epps
Assistant Examiner—Jordan M. Schwartz
Attorney, Agent, or Firm—Cushman Darby Cushman IP Group of Pillsbury Madison & Sutro LLP

[57] ABSTRACT

The invention provides a compact zoom lens system for use on still video cameras, which has a zoom ratio of about 3, an F-number of about 2.0 to about 2.8 at the wide-angle end and a field angle as wide as about 60°, and comprises a first group G1 having positive refracting power, a second group G2 having negative refracting power and movable along the optical axis for zooming and focusing and a third group G3 having positive refracting power and movable along the optical axis for zooming. The second group is constantly less than 1 in terms of the absolute value of its magnification, and the third group moves such that the relation between its position on the optical axis and the focal length of the overall system is moving toward the object side. The system conforms to Cond. (1) with respect to the ratio of the zoom ratio of the second group upon focused on a nearby object point to the zoom ratio of the second group upon focused on an object point at infinity, Cond. (2) with respect to the air separation on the optical axis between the first and second groups at the wide-angle end upon focused on an object point at infinity, and Cond. (3) with respect to the amounts of movement of the second group at the wide-angle and telephoto ends upon focused from one object point onto another object point.

11 Claims, 6 Drawing Sheets

(Wide-angle end)

FIG. 2(b)

(Intermediate)

FIG. 2(c)

(Telephoto end)

FIG. 3(a)

(Wide-angle end)

FIG. 3(b)

(Intermediate)

FIG. 3(c)

(Telephoto end)

FIG. 4(a)
(Wide-angle end)

FIG. 4(b)
(Intermediate)

FIG. 4(c)
(Telephoto end)

FIG. 5(a)

(Wide-angle end)

FIG. 5(b)

(Intermediate)

FIG. 5(c)

(Telephoto end)

FIG. 6(a)
(Wide-angle end)

FIG. 6(b)
(Intermediate)

FIG. 6(c)
(Telephoto end)

COMPACT REAR FOCUSING ZOOM LENS SYSTEM

BACKGROUND OF THE INVENTION

The present invention relates generally to a zoom lens system used with photographic equipment such as video cameras, and more particularly to a compact rear focusing zoom lens system for use on still video cameras.

With the spread of still video cameras and advanced semiconductor technology, there is a great demand for reductions in the number of mechanical parts involved. Optical systems mounted on them, too, are now increasingly required to be reduced in size and cost. Under such situations, attention is paid to an optical system having an F-number of about 2.0 to about 2.8 at a variable power ratio of about 3 and a field angle of about 60° wider than ever before is required at the wide angle end. Zoom lens systems for use on still video cameras, which comprise a relatively small number of lens elements and are of suitable size, are typically known from JP-A 63(1988)-287810 and JP-A 64(1989)-91110. These lens systems are basically made up of three lens groups or a positive, a negative and a positive in order from the object side, with a stop fixed between the second and third lens groups. More specifically, focusing is achieved by the first lens group while zooming is achieved by the second group which is divided into two negative and positive sub-groups for the purpose of correcting an incidental variation of the focal position and moved in the same direction for the purpose of zooming. Among these, there is a lens system made up of eight lens elements. One problem with these examples, however, is that since the overall depth of the entrance pupil is large due to the fact that the third lens group located between the stop and the image side remains fixed in place, the diameter of the first lens group is likely to become large. Accordingly, the field angle achieved at the wide-angle end is at most 50°, and so is not particularly suited for still cameras. Another problem is that since focusing must be carried out by the first group as usual, it is required that the heaviest lens be driven by an automatic focusing mechanism, thus making the efficiency of the system worse and rendering it impossible to shorten the nearby object distance.

To eliminate the latter problem, a rear focusing system has been proposed, as known from JP-A 4(1992)-42115. This system makes use of the magnification of the second group which has negative refracting power and bears a chief part of zooming action, said magnification varying within a range exclusive of life size. In Example 4 in particular, the former problem is solved by the monotonous movement, during zooming, of the third group located between the stop and the image side with respect to the focal length of the overall system. However, when variations of aberrations produced due to zooming are reduced, it is likely that residual aberrations increase, and to avoid this an additional fixed fourth group is provided. Thus, this system is not only made up of a large number of lens elements but also fails to meet the demand for the field angle.

SUMMARY OF THE INVENTION

In view of the above-mentioned problems associated with the prior art, an object of the present invention is to provide a compact zoom lens system designed for use on still video cameras, which has a variable power ratio of about 3, and an F-number of about 2.0 to about 2.8 at the wide-angle end and a field angle as wide as about 60°.

According to one aspect of the present invention, the object as above mentioned is achieved by the provision of a compact rear focusing zoom lens system characterized by comprising, in order from the object side, a first group having positive refracting power, a second group having negative refracting power and movable along the optical axis in its entirety for zooming and focusing, and a third group having positive refracting power and movable along the optical axis for zooming, said second group being constantly less than 1 in terms of the absolute value of its magnification, and said third group consisting of up to three lenses and moving such that the relation between its position on the optical axis and the focal length of the overall system is moving toward the object side, and characterized by conforming to the following conditions (1), (2) and (3):

$$0.8 < 2^\gamma N / 2^\gamma INF < 1.0 \quad (1)$$

$$0.25 < D_{12W}/f_W < 0.5 \quad (2)$$

$$0.4 < L_W/L_T < 1.0 \quad (3)$$

Here $2^\gamma N$ is the magnification ratio of the second group upon focused on a nearby object point, $2^\gamma INF$ is the magnification ratio of the second group upon focused on an object point at infinity, $D_{12W}$ is the air separation on the optical axis between the first and second groups at the wide-angle end upon focused on an object point at infinity, $f_W$ is the focal length of the overall system at the wide-angle end upon focused on an object point at infinity, and $L_W$ and $L_T$ are the amounts of movement of the second group at the wide-angle and telephoto ends, respectively, upon focused from one object point onto another object point.

According to another aspect of the present invention, there is provided a compact rear focusing zoom lens system characterized by comprising, in order from the object side, a first group having positive refracting power, a second group having negative refracting power and movable along the optical axis in its entirety for zooming and focusing, and a third group having positive refracting power and movable along the optical axis for zooming, said second group being constantly less than 1 in terms of the absolute value of its magnification, and said third group consisting only of three lenses and moving such that the relation between its position on the optical axis and the focal length of the overall system is moving toward the object side, and characterized by conforming to the following conditions (1), (2) and (3):

$$0.8 < 2^\gamma N / 2^\gamma INF < 1.0 \quad (1)$$

$$0.25 < D_{12W}/f_W < 0.5 \quad (2)$$

$$0.4 < L_W/L_T < 1.0 \quad (3)$$

Here $2^\gamma N$ is the magnification ratio of the second group upon focused on a nearby object point, $2^\gamma INF$ is the magnification ratio of the second group upon focused on an object point at infinity, $D_{12W}$ is the air separation on the optical axis between the first and second groups at the wide-angle end upon focused on an object point at infinity, $f_W$ is the focal length of the overall system at the wide-angle end upon focused on an object point at infinity, and $L_W$ and $L_T$ are the amounts of movement of the second group at the wide-angle and telephoto ends, respectively, upon focused from one object point onto another object point.

According to still another aspect of the present invention, there is provided a compact rear focusing zoom lens system characterized by comprising, in order from the object side, a first group consisting of a positive lens alone, a second group having negative refracting power and movable along the optical axis in its entirety for zooming and focusing, and a third group having positive refracting power and movable along the optical axis for zooming, said second group being constantly less than 1 in terms of the absolute value of its magnification, and said third group moving such that the relation between its position on the optical axis and the focal length of the overall system is moving toward the object side, and characterized by conforming to the following conditions (1), (2) and (3):

$$0.8 < 2^{\gamma}N/2^{\gamma}INF < 1.0 \quad (1)$$

$$0.25 < D_{12W}/f_W < 0.5 \quad (2)$$

$$0.4 < L_W/L_T < 1.0 \quad (3)$$

Here $2^{\gamma}N$ is the magnification ratio of the second group upon focused on a nearby object point, $2^{\gamma}INF$ is the magnification ratio of the second group upon focused on an object point at infinity, $D_{12W}$ is the air separation on the optical axis between the first and second groups at the wide-angle end upon focused on an object point at infinity, $f_W$ is the focal length of the overall system at the wide-angle end upon focused on an object point at infinity, and $L_W$ and $L_T$ are the amounts of movement of the second group at the wide-angle and telephoto ends, respectively, upon focused from one object point onto another object point.

In these zoom lens systems, it is further desired that the following conditions (4), (5) and (6) be satisfied:

$$1.0 < (D_{12T} - D_{12W})/f_W < 1.9 \quad (4)$$

$$0.6 < \beta_{3T}/(\beta_{3W}\gamma) < 0.95 \quad (5)$$

$$-0.4 < \beta_{2T} < -0.14 \quad (6)$$

Here $D_{12T}$ is the air separation on the optical axis between the first and second group at the telephoto end upon focused on an object point at infinity, $\beta_{3T}$ is the magnification of the third group at the telephoto end upon focused on an object point at infinity, $\beta_{3W}$ is the magnification of the third group at the wide-angle end upon focused on an object point at infinity, $\gamma$ is the variable power ratio of the overall system, and $\beta_{2T}$ is the magnification of the second group at the telephoto end upon focused on an object point at infinity.

It is also desired that among the positive lenses contained in the third group, the positive lens proximate to the object side include an aspheric surface while among the negative lenses contained in the third group, the negative lens proximate to the image side are in meniscus form concave on the image side, and the following conditions (7), (8) and (9) are satisfied.

$$-1.5 < (r_{31}+r_{32})/(r_{31}-r_{32}) < -0.2 \quad (7)$$

$$1.1 < (r_{33}+r_{34})/(r_{33}-r_{34}) < 4.0 \quad (8)$$

$$0.46 < t_{31}/f_W < 1.2 \quad (9)$$

Here $r_{31}$ and $r_{32}$ are the radii of curvature of the respective lens surfaces, on the object and image sides, of the positive lens contained in the third group, which is closest to the object side, $r_{33}$ and $r_{34}$ are the radii of curvature of the respective lens surfaces, on the object and image sides, of the negative lens contained in the third group, which is closest to the image side, and $t_{31}$ is the thickness, on the optical axis, of the positive lens contained in the third group, which is closest to the object side.

According to a further aspect of the present invention, there is provided a compact rear focus zoom lens system comprising, in order from the object side, a first group having positive refracting power, a second group having negative refracting power and movable along the optical axis in its entirety for zooming and focusing, and a third group having positive refracting power and movable along the optical axis for zooming, said second group being constantly less than 1 in terms of the absolute value of its magnification, and said third group consisting of up to four lenses and including a positive lens located closest to the object side, the positive lens having an aspheric surface and a negative meniscus lens concave on the image side, and conforming to the following conditions (7), (8) and (9):

$$-1.5 < (r_{31}+r_{32})/(r_{31}-r_{32}) < -0.2 \quad (7)$$

$$1.1 < (r_{33}+r_{34})/(r_{33}-r_{34}) < 4.0 \quad (8)$$

$$0.46 < t_{31}/f_W < 1.2 \quad (9)$$

Here $r_{31}$ and $r_{32}$ are the radii of curvature of the respective lens surfaces, on the object and image sides, of the positive lens of the third group proximate to the object side, $r_{33}$ and $r_{34}$ are the radii of curvature of the respective lens surfaces, on the object and image sides, of the negative meniscus lens contained in the third group, and $t_{31}$ is the thickness, on the optical axis, of the positive lens of the third group proximate to the object side.

A detailed account will now be given of why the above-mentioned arrangements are used and how they work.

For the present invention, especially for the arrangements as above mentioned, it is advantageous to carry out rear focusing by using a three (positive-negative-positive)-group zoom lens type and moving the second group along the optical axis. However, there are some technical problems in connection with the securing of focusing space and control of a difference in the amount of lens extension due to focal length and a focal length change due to focusing (deterioration of variable power ratio). According to the present invention, such problems can be solved or substantially eliminated.

According to the present invention, shape and other factors for the respective lens elements of the third group can be optimized to provide a solution to a technical problem with achieving a compact, low-cost zoom lens system improved in the ability to form images; in other words, a fixed fourth group used for correcting variations of aberrations produced by the focusing movement of the third group can be dispensed with.

Cond. (1) gives a definition of the ratio of the magnification ratio $2^{\gamma}N$ of the second group upon focused on a nearby object point to the zoom ratio $2^{\gamma}INF$ of the second group upon focused on an object point at infinity. Falling below the lower limit of 0.8 is not preferable because the magnification ratio of the second group upon focused on a nearby object point becomes insufficient; so the demerit caused by focusing with the second group becomes large. Cond. (2) gives a definition of the air separation $D_{12W}$, on the optical axis, between the first and second groups at the wide-angle end upon focused on an object point at infinity. Falling below the lower limit of 0.25 is not preferable because it is impossible to place the focus on a nearby object point at the wide-angle end. Exceeding the upper limit of 0.5 is again not preferred because the depth of the entrance pupil becomes large, thus making it likely to increase the diameter of the front lens. Cond. (3) gives a definition of the ratio of the amounts $L_W$ and $L_T$ of movement of the second group at the wide-angle and telephoto ends, respectively, upon focused from one object point onto another. Falling below the lower limit of 0.4 is not preferable because difficulty is involved in automatic focusing, automatic control of correction of focal position, and so on.

In view of focus control, Conds. (1) to (3) should preferably reduce to $$0.9 < 2^\gamma N/2^\gamma INF < 1.0 \tag{1}'$$

$$0.29 < D_{12W}/f_W < 0.47 \tag{2}'$$

$$0.5 < L_W/L_T < 1.0 \tag{3}'$$

To reduce the diameter of the front lens while the field angle at the wide-angle end is kept at about 60° C., the focusing space for the second group should preferably be reduced as much as possible, as given by $$1.0 < (D_{12T} - D_{12W})/f_W < 1.9 \tag{4}$$

Here $D_{12W}$ and $D_{12T}$ are the air separations, on the optical axis, between the first and second groups at the wide-angle and telephoto ends, respectively, upon focused on an object point at infinity, and $f_W$ is the focal length of the overall system at the wide-angle end upon focused on an object point at infinity. Exceeding the upper limit of 1.9 in Cond. (4) is not preferable because the diameter of the front lens increases. Falling below the lower limit of 1.0 makes the presence of the first group useless, because the merit of a substantial two (negative-positive)-group zoom lens type vanishes.

To achieve a further reduction in the diameter of the front lens, Cond. (4) should preferably reduce to $$1.2 < (D_{12T} - D_{12W})/f_W < 1.7 \tag{4}'$$

Thus, since the focusing space for the second group must be reduced, it is desired that a chief part of the zooming action so far born by the second group be born by the third group. In other words, it is desired that the third group be designed such that it moves monotonously toward the object side as the focal length of the overall system increases during zooming, so that the third group can have as large zooming action as possible, as given by $$0.6 < \beta_{3T}/(\beta_{3W}\gamma) < 0.95 \tag{5}$$

Here $\beta_{3T}$ is the magnification of the third group at the telephoto end upon focused on an object point at infinity, $\beta_{3W}$ is the magnification of the third group at the wide-angle end upon focused on an object point at infinity, and $\gamma$ is the variable power ratio of the overall zoom lens system. Falling below the lower limit of 0.6 in Cond. (5) is not preferable because the diameter of the front lens becomes large. Exceeding the upper limit of 0.95 makes the presence of the first group useless, because the merit of a substantial two (positive-negative)-group zoom type vanishes.

To place the three-group zoom lens system in the best-balanced state, i.e., to take advantage of the merit of the three-group zoom lens system while the diameter of the front lens is reduced, Cond. (5) should preferably reduce to $$0.75 < \beta_{3T}/(\beta_{3W}\gamma) < 0.88 \tag{5}'$$

In such a zoom lens system, rear focusing is done by moving the third group or the fourth group, if any, rather than by moving the second group. However, the third group according to the present invention is very poor in efficiency, because it comes closes to the second group at the telephoto end where the amount of focusing movement becomes largest and focusing space must be separately secured. The second group of the present invention, on the other hand, is very excellent in efficiency, because the absolute value of its magnification is constantly much less than 1 due to a reduced zooming range, there is limited deterioration of magnification due to focusing on a nearby object point, and it is extended toward the first group so that existing space is available. Focusing on the wide-angle side is feasible merely by making the separation between the first and second groups at the wide-angle end slightly larger than usual. A small difference in the amount of extension between the wide-angle and telephoto ends offers another advantage in view of control.

In the present invention, it is thus favorable that focusing is done by the second group. Then, the magnification of the second group is specifically given by $$-0.4 < \beta_{2T} < -0.14 \tag{6}$$

Here $\beta_{2T}$ is the magnification of the second group at the telephoto end upon focused on an object point at infinity. Exceeding the upper limit of -0.14 in Cond. (6) renders the presence of the first group useless, because the merit of a substantial two (negative-positive)-group zoom lens type vanishes. Falling below the lower limit of -0.4 is not preferable because the diameter of the front lens becomes large.

To place the three-group zoom lens system in the best-balanced state, i.e., to take advantage of the merit of the three-group zoom lens system while the diameter of the front lens is reduced, Cond. (6) should preferably reduce to $$-0.37 < \beta_{2T} < -0.17 \tag{6}'$$

In the present invention, the third group is designed such that it moves monotonously toward the object side as the focal length of the overall system increases during zooming, so that the third group can have as large zooming action as possible. In this case, variations of aberrations produced during zooming are likely to become large. To avoid such likelihood, the shape of each lens element should be taken into consideration. It is therefore preferable that the third group consists of up to four lens elements, and includes an aspheric surface in a positive lens element located proximately to the object side, has a negative lens element of meniscus shape concave on the image side, which is located proximately to the image side, and conforms to the following conditions (7), (8) and (9):

$$-1.5 < (r_{31} + r_{32})/(r_{31} - r_{32}) < 0.2 \tag{7}$$

$$1.1 < (r_{33} + r_{34})/(r_{33} - r_{34}) < 4.0 \tag{8}$$

$$0.46 < t_{31}/f_W < 1.2 \tag{9}$$

Here $r_{31}$ and $r_{32}$ are the radii of curvature of the respective lens surfaces, on the object and image sides, of the positive lens of the third group proximate to the object side, $r_{33}$ and $r_{34}$ are the radii of curvature of the respective lens surfaces, on the object and image sides, of the negative lens of the third group proximate to the image side, and $t_{31}$ is the thickness, on the optical axis, of the positive lens of the third group proximate to the object side.

Conds. (7) and (8) give a definition of shape factors for the positive and negative lenses of the third group that are proximate to the object and image sides, respectively. Falling below the lower limit of −1.5 in Cond. (7) or exceeding the upper limit of 4.0 in Cond. (8) is not preferable because the amount of spherical aberration produced by the third group becomes too large. Exceeding the upper limit of −0.2 in Cond. (7) or falling below the lower limit of 1.1 in Cond. (8), on the other hand, is again not preferable because the curvature of the meridional image surface formed by the third group becomes too large. Cond. (9) gives a definition of the thickness, on the optical axis, of the positive lens of the third group proximate to the object side. At lower than the lower limit of 0.46 the astigmatic difference is likely to become large, and at more than the upper limit of 1.2 the overall length of the system is likely to become long.

To achieve a further improvement in the ability to form images, Conds. (7), (8) and (9) should preferably reduce to $$-1.2<(r_{31}+r_{32})/(r_{31}-r_{32})<-0.25 \qquad (7)'$$

$$1.5<(r_{33}+r_{34})/(r_{33}-r_{34})<4.0 \qquad (8)'$$

$$0.55<t_{31}/f_W<1.0 \qquad (9)'$$

In the zoom lens system of the above-mentioned construction, it is desired that the first group is constantly fixed in place, because the diameter of the first group can be reduced.

Still other objects and advantages of the invention will in part be obvious and will in part be apparent from the specification.

The invention accordingly comprises the features of construction, combinations of elements, and arrangement of parts will be exemplified in the construction hereinafter set forth, and the scope of the invention will be indicated in the claims.

DESCRIPTION OF THE PREFERRED EMBODIMENTS

Examples 1 to 6 of the compact rear focus zoom lens system according to the present invention will now be explained.

Numerical data will be given later. FIGS. 1(a) to 6(c) are sectional schematics of the zoom lens system of Examples 1 to 6 according to the present invention wherein the positions of the respective lens groups at the wide-angle end, an intermediate focal length and the telephoto end upon focused on an object point at infinity are compared with one another.

The lens arrangement of each example will now be explained. In each example, it is noted that the second and third groups G2 and G3 move toward the image and object sides, respectively, for zooming from the wide-angle to telephoto end, while the first group G1, a stop S and filters F such as an infrared cutoff filter and low-pass filter remain fixed.

Figure 1A:
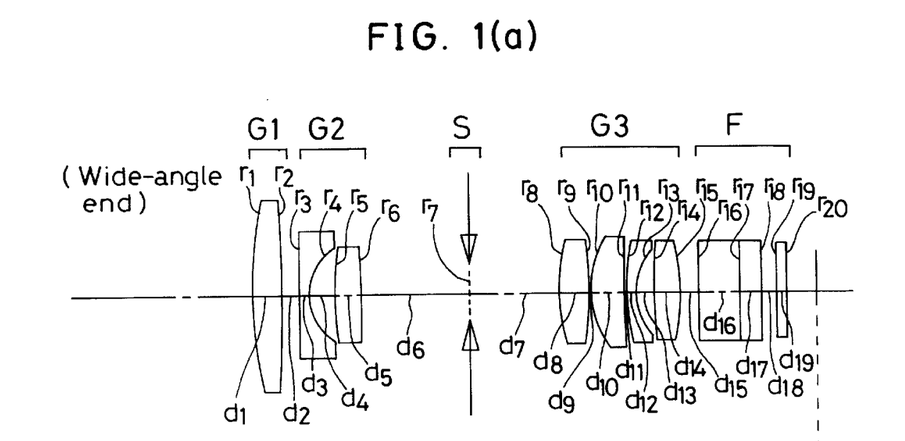
FIGS. 1(a)–1(c) are sectional schematics of the zoom lens system of Example 1 according to the present invention wherein the positions of the respective lens groups at the wide-angle end, an intermediate focal length and the telephoto end upon focused on an object point at infinity are compared with one another.
Figure 1B:
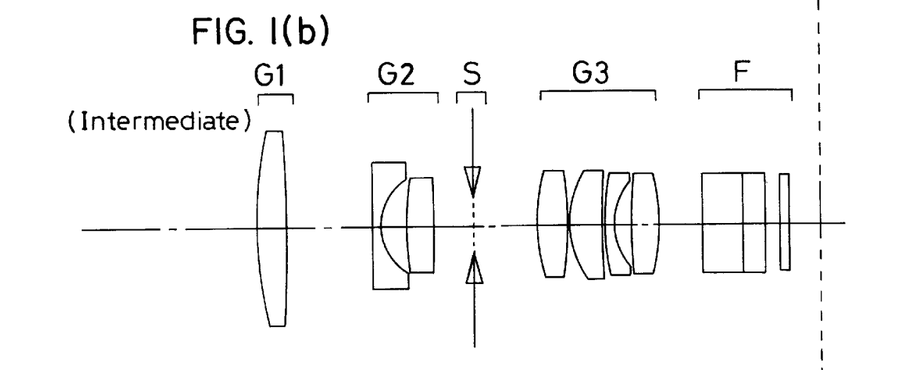
Figure 1C:
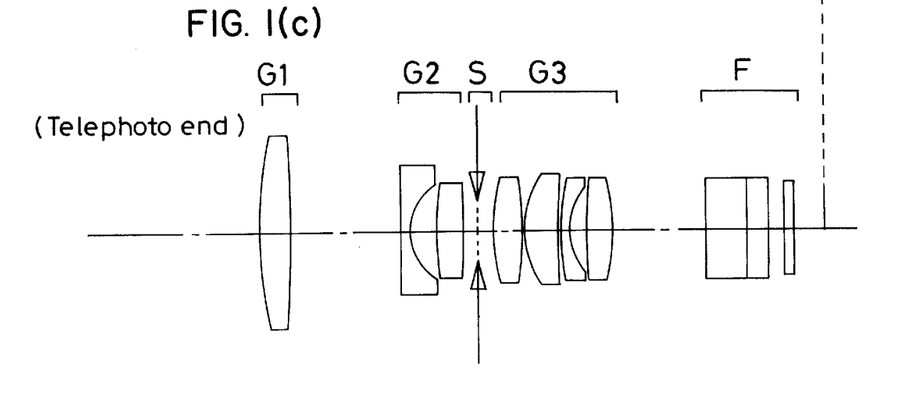

In Example 1, the first group G1 consists of a double-convex lens, the second group G2 consists of a double-concave lens and a double-convex lens, two in all, and the third group G3 consists of a double-convex lens, a positive meniscus lens convex on the object side, a negative meniscus lens convex on the object side and a double-convex lens, four in all, as can be seen from FIGS. 1(a)–1(c). As illustrated, three aspheric surfaces are used, one for the image-side surface of the double-convex lens of the second group G2, one for the object-side surface of the double-convex lens of the third group G3 that is proximate to the object side, and one for the object-side surface of the double-convex lens of the third group G3 that is proximate to the image side.

Figure 2A:
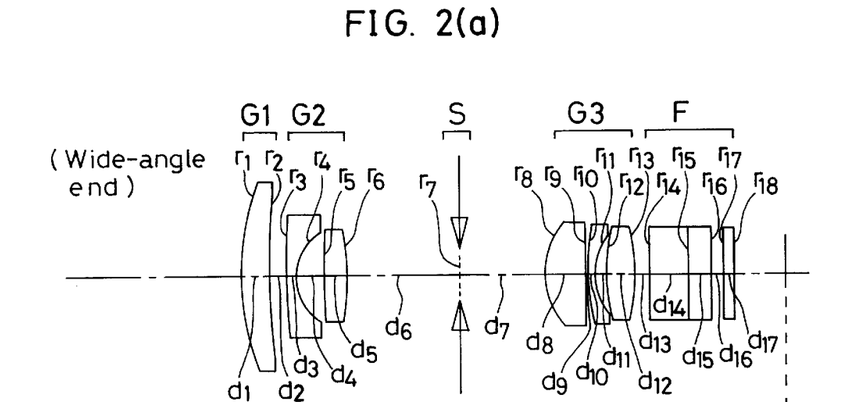
FIGS. 2(a)–2(c) are sectional schematics of the zoom lens system of Example 2 according to the present invention, which are similar to those of FIGS. 1(a)–1(c).
Figure 2B:
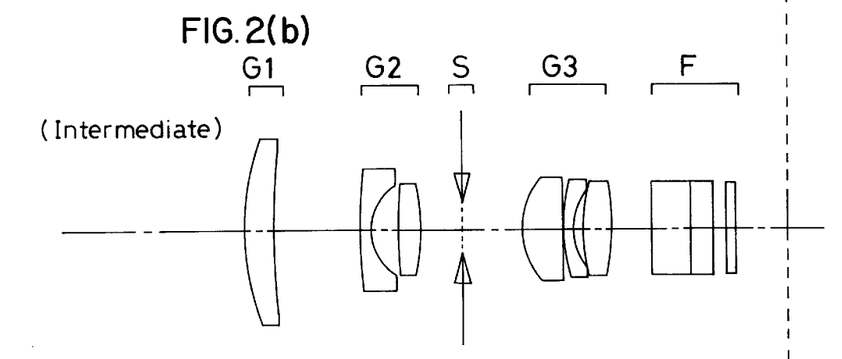
Figure 2C:
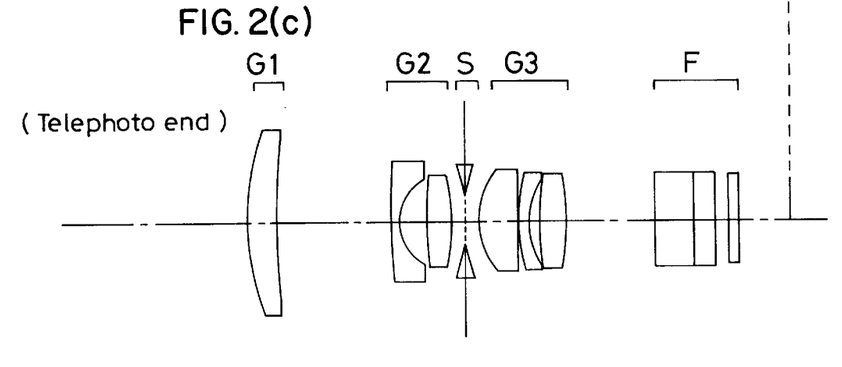

In Example 2, the first group G1 consists of a positive meniscus lens convex on the object side, the second group G2 consists of a negative meniscus lens convex on the object side and a double-convex lens, two in all, and the third group G3 consists of a double-convex lens, a negative meniscus lens convex on the object side and a double-convex lens, three in all, as can be seen from FIGS. 2(a)–2(c). As illustrated, four aspheric surfaces are used, two for both surfaces of the double-convex lens of the second group G2, one for the object-side surface of the double-convex lens of the third group G3 that is proximate to the object side, and one for the image-side surface of the double-convex lens of the third group G3 that is proximate to the image side.

Figure 3A:
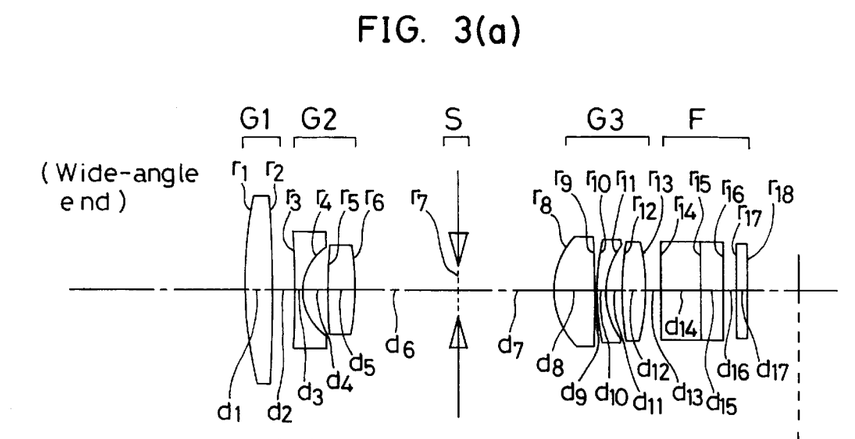
FIGS. 3(a)–3(c) are sectional schematics of the zoom lens system of Example 3 according to the present invention, which are similar to those of FIGS. 1(a)–1(c).
Figure 3B:
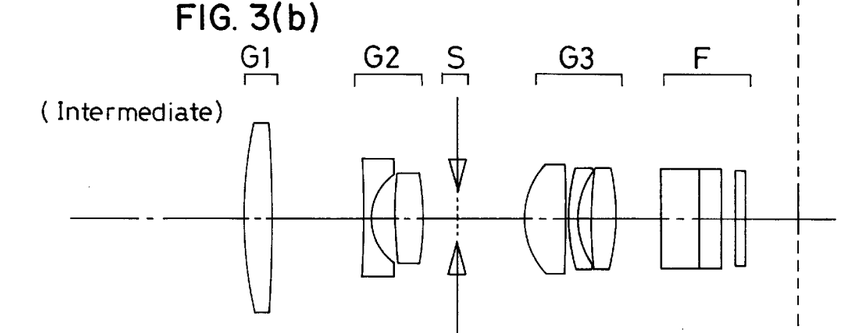
Figure 3C:
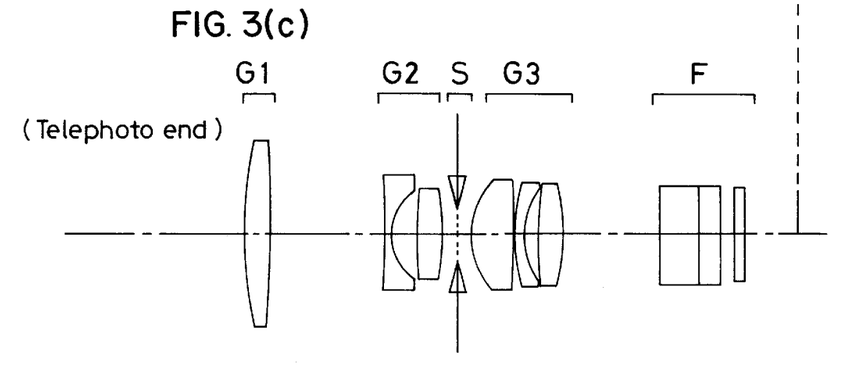

In Example 3, the first group G1 consists of a double-convex lens, the second group G2 consists of a double-concave lens and a double-convex lens, two in all, and the third group G3 consists of a double-convex lens, a negative meniscus lens convex on the object side and a double-convex lens, three in all, as can be seen from FIGS. 3(a)–3(c). As illustrated, three aspheric surfaces are used, one for the image-side surface of the double-convex lens of the second group G2, one for the object-side surface of the double-convex lens of the third group G3 that is proximate to the object side, and one for the object-side surface of the double-convex lens of the third group G3 that is proximate to the image side.

Figure 4A:
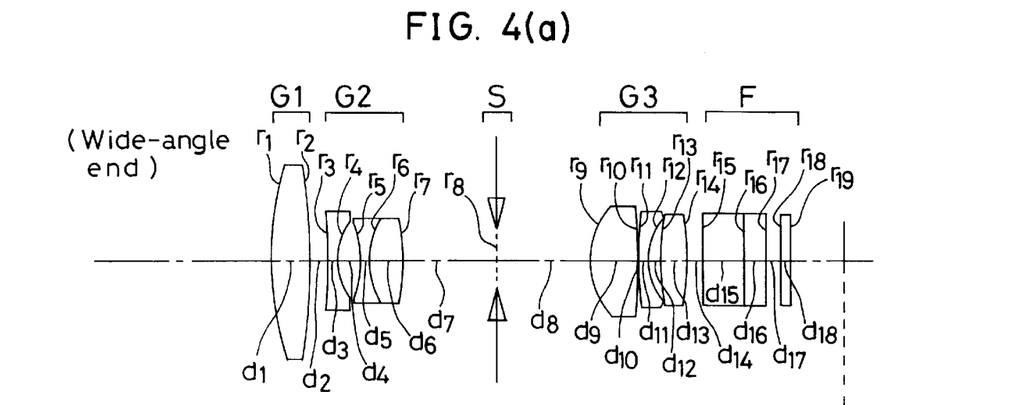
FIGS. 4(a)–4(c) are sectional schematics of the zoom lens system of Example 4 according to the present invention, which are similar to those of FIGS. 1(a)–1(c).
Figure 4B:
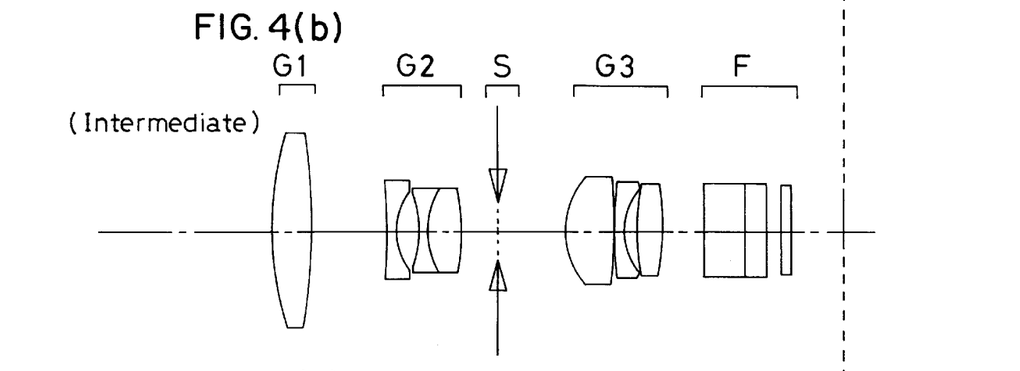
Figure 4C:
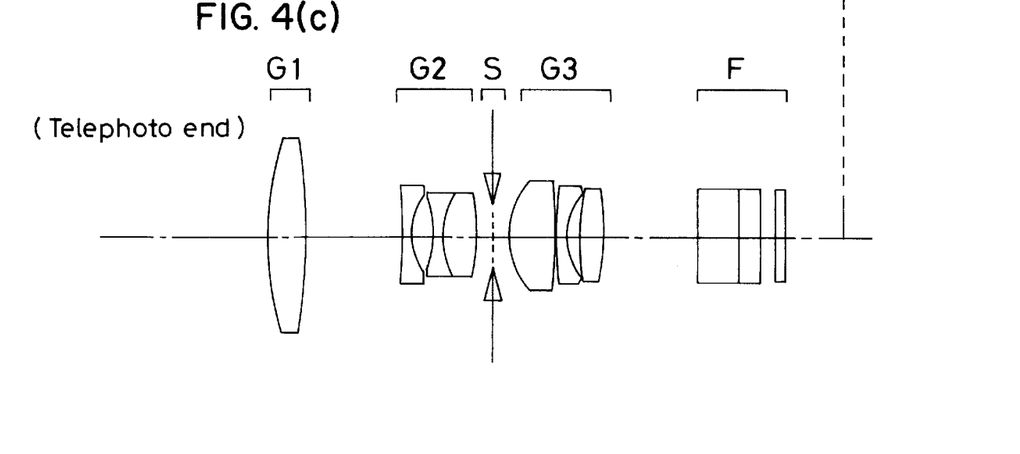

In Example 4, the first group G1 consists of a double-convex lens, the second group G2 consists of a double-concave lens and a cemented doublet of double-concave and double-convex lenses, three in all, and the third group G3 consists of a double-convex lens, a negative meniscus lens convex on the object side and a double-convex lens, three in all, as can be seen from FIGS. 4(a)–4(c). As illustrated, two aspheric surfaces are used, one for the object-side surface of the double-convex lens of the third group G3 that is proximate to the object side and another for the object-side surface of the double-convex lens of the third group G3 that is proximate to the image side.

Figure 5A:
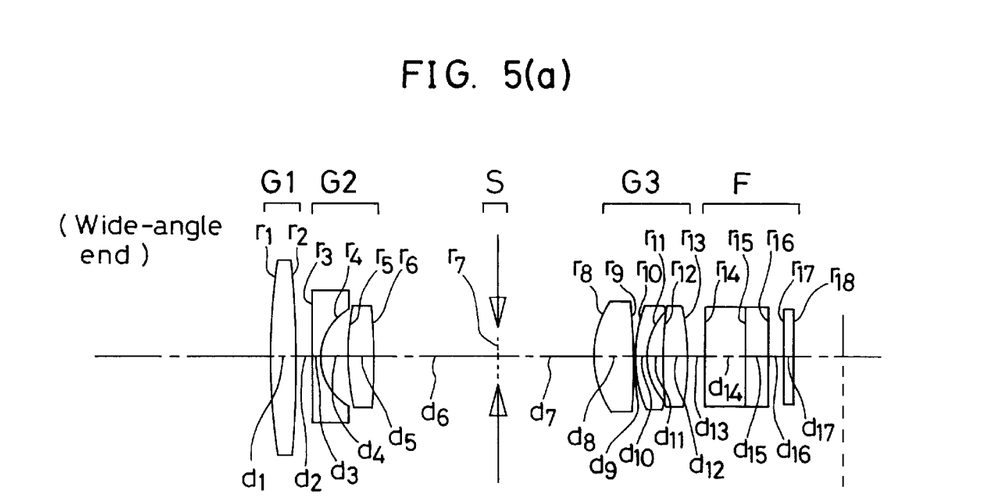
FIGS. 5(a)–5(c) are sectional schematics of the zoom lens system of Example 5 according to the present invention, which are similar to those of FIGS. 1(a)–1(c).
Figure 5B:
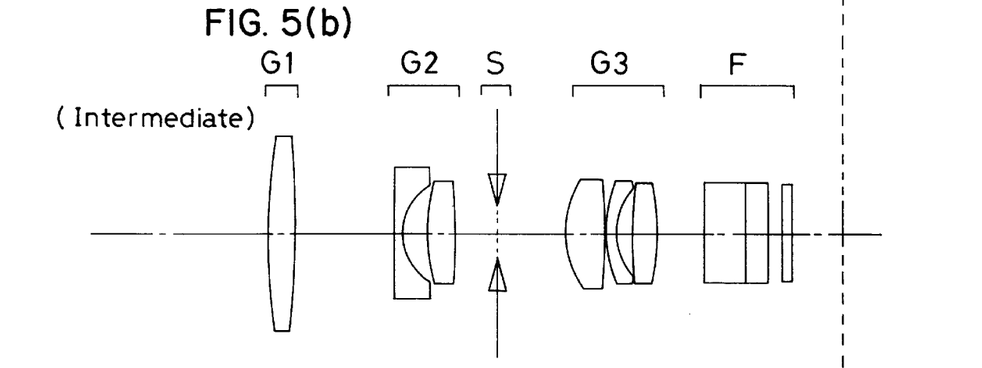
Figure 5C:
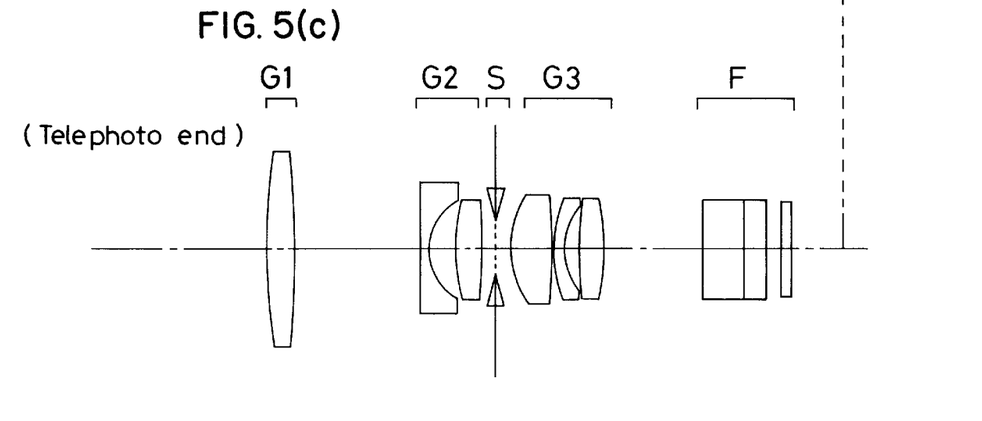

In Example 5, the first group G1 consists of a double-convex lens, the second group G2 consists of a double-concave lens and a positive meniscus lens convex on the object side, two in all, and the third group G3 consists of a double-convex lens, a negative meniscus lens convex on the object side and a double-convex lens 3, three in all, as can be seen from FIGS. 5(a)–5(c). As illustrated, two aspheric surfaces are used, one for the image-side surface of the double-convex lens of the second group G2 and another for the object-side surface of the double-convex lens of the third lens G3 that is proximate to the object side.

Figure 6A:
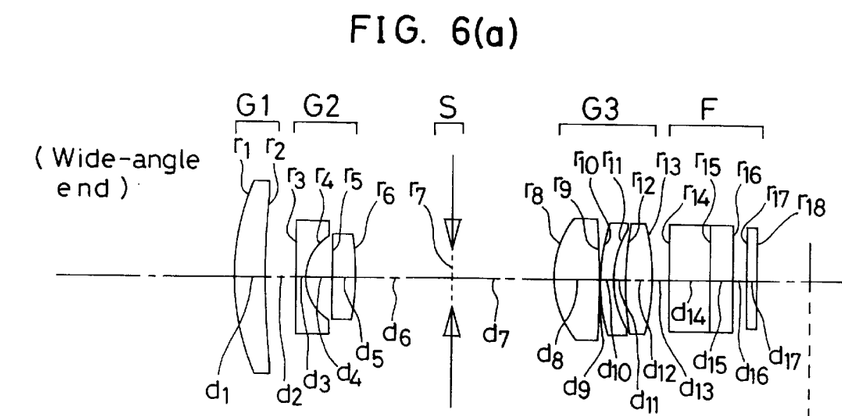
FIGS. 6(a)–6(c) are sectional schematics of the zoom lens system of Example 6 according to the present invention, which are similar to those of FIGS. 1(a)–1(c).
Figure 6B:
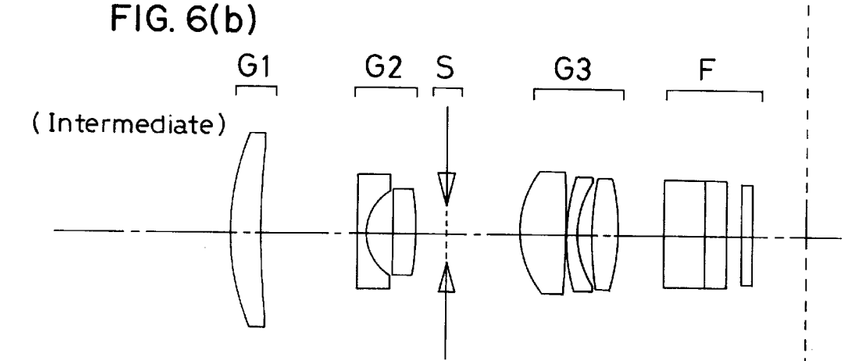
Figure 6C:
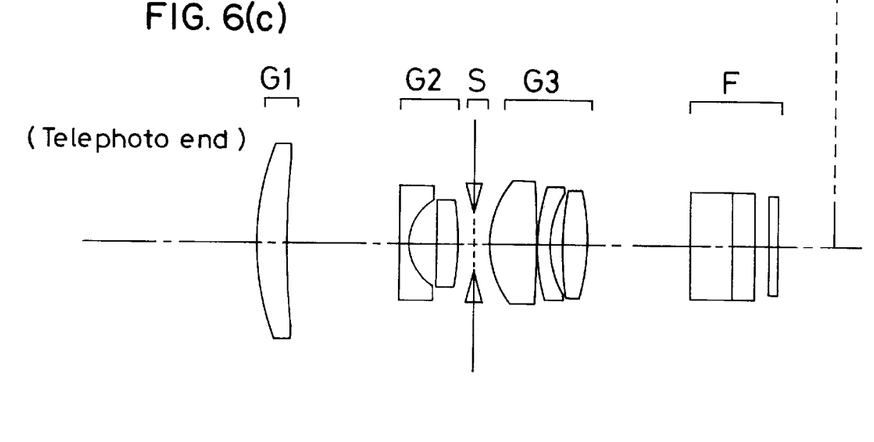

In Example 6, the first group G1 consists of a positive meniscus lens convex on the object side, the second group G2 consists of a double-concave lens and a double-convex lens, two in all, and the third group G3 consists of a double-convex lens, a negative meniscus lens convex on the object side and a double-convex lens, three in all, as can be seen from FIGS. 6(a)–6(c). As illustrated, four aspheric surfaces are used, two for both surfaces of the double-convex lens of the second group G2, one for the object-side surface of the double-convex lens of the third group G3 that is proximate to the object side, and one for the object-side surface of the double-convex lens of the third group G3 that is proximate to the image side.

Set out below are numerical data about each data. Symbols used hereinafter but not hereinbefore mean:

f is the focal length of the overall system, $F_{NO}$ is an F-number $2\omega$ is the field angle, $r_1, r_2, \ldots$ are the radii of curvature of the respective lens surfaces, $d_1, d_2, \ldots$ are the separations between the respective lens surfaces, $n_{d1}, n_{d2}, \ldots$ are the d-line indices of refraction of the respective lens surfaces, $\nu_{d1}, \nu_{d2}, \ldots$ are the Abbe's numbers of the respective lenses.

Now let x and y denote the direction of propagation of light on the optical axis and the direction orthogonal to the optical axis. Then, aspheric shape is expressed by $$x=(y^2/r)/[1+\{1-(y/r)^2\}^{1/2}]+A_4 y^4+A_6 y^6+A_8 y^8+A_{10} y^{10}+A_{12} y^{12}$$

Here r is the paraxial radius of curvature, and $A_4, A_6, A_8, A_{10}$ and $A_{12}$ are the fourth, sixth, eighth, tenth and twelfth aspherical coefficients.

Example 1
f = 5.150 ~ 8.770 ~ 14.935
$F_{NO}$ = 2.87 ~ 3.34 ~ 4.87
$2\omega$ = 62.9° ~ 39.5° ~ 23.8°

| | | | |
|---|---|---|---|
| $r_1$ = 30.4252 | $d_1$ = 2.4000 | $n_{d1}$ = 1.48749 | $\nu_{d1}$ = 70.21 |
| $r_2$ = -213.7959 | $d_2$ = (Variable) | | |
| $r_3$ = -391.6978 | $d_3$ = 0.8000 | $n_{d2}$ = 1.60311 | $\nu_{d2}$ = 60.70 |
| $r_4$ = 4.2124 | $d_4$ = 1.8500 | | |
| $r_5$ = 19.9326 | $d_5$ = 2.3000 | $n_{d3}$ = 1.80518 | $\nu_{d3}$ = 25.43 |
| $r_6$ = 70.4156(Aspheric) | $d_6$ = (Variable) | | |
| $r_7$ = ∞ (Stop) | $d_7$ = (Variable) | | |
| $r_8$ = 15.2055(Aspheric) | $d_8$ = 2.4000 | $n_{d4}$ = 1.67790 | $\nu_{d4}$ = 55.33 |
| $r_9$ = -27.0786 | $d_9$ = 0.1500 | | |
| $r_{10}$ = 7.7585 | $d_{10}$ = 2.7000 | $n_{d5}$ = 1.56873 | $\nu_{d5}$ = 63.16 |
| $r_{11}$ = 158.3594 | $d_{11}$ = 0.1500 | | |
| $r_{12}$ = 23.4164 | $d_{12}$ = 0.8000 | $n_{d6}$ = 1.84666 | $\nu_{d6}$ = 23.78 |
| $r_{13}$ = 5.6921 | $d_{13}$ = 1.2000 | | |
| $r_{14}$ = 41.1812(Aspheric) | $d_{14}$ = 2.4000 | $n_{d7}$ = 1.70154 | $\nu_{d7}$ = 41.24 |
| $r_{15}$ = -12.2810 | $d_{15}$ = (Variable) | | |
| $r_{16}$ = ∞ | $d_{16}$ = 3.2222 | $n_{d8}$ = 1.51633 | $\nu_{d8}$ = 64.15 |
| $r_{17}$ = ∞ | $d_{17}$ = 1.7778 | $n_{d9}$ = 1.61700 | $\nu_{d9}$ = 62.79 |
| $r_{18}$ = ∞ | $d_{18}$ = 1.1111 | | |
| $r_{19}$ = ∞ | $d_{19}$ = 0.8333 | $n_{d10}$ = 1.51633 | $\nu_{d10}$ = 64.15 |
| $r_{20}$ = ∞ | | | |

Zooming Spaces

| | | | |
|---|---|---|---|
| f | 5.150 | 8.770 | 14.935 |
| $d_2$ | 1.500 | 7.067 | 9.064 |
| $d_6$ | 8.764 | 3.197 | 1.200 |
| $d_7$ | 7.247 | 5.149 | 1.200 |
| $d_{15}$ | 1.200 | 3.297 | 7.247 |

Amount of Movement of Second Group for Focusing

| | | | |
|---|---|---|---|
| f | 5.150 | 8.770 | 14.935 |
| | 0.449 | 0.579 | 0.640 |

Aspherical Coefficients

6th surface $A_4$ = -0.64387 × $10^{-3}$
$A_6$ = -0.19207 × $10^{-4}$
$A_8$ = -0.12155 × $10^{-5}$
$A_{10}$ = 0.14868 × $10^{-6}$
$A_{12}$ = -0.10117 × $10^{-7}$ 8th surface $A_4$ = -0.20333 × $10^{-3}$ -continued $A_6 = 0.92602 \times 10^{-5}$
$A_8 = -0.39722 \times 10^{-5}$
$A_{10} = 0.37701 \times 10^{-7}$
$A_{12} = -0.28378 \times 10^{-8}$ 14th surface $A_4 = 0.89157 \times 10^{-4}$
$A_6 = -0.13822 \times 10^{-4}$
$A_8 = 0.34891 \times 10^{-5}$
$A_{10} = -0.23673 \times 10^{-6}$
$A_{12} = 0.76891 \times 10^{-8}$ Example 2
$f = 5.150 \sim 8.770 \sim 14.935$
$F_{NO} = 2.87 \sim 3.34 \sim 4.87$
$2\omega = 62.9° \sim 39.5° \sim 23.8°$

| | | | |
|---|---|---|---|
| $r_1 = 22.0131$ | $d_1 = 2.4000$ | $n_{d1} = 1.48749$ | $\nu_{d1} = 70.21$ |
| $r_2 = 76.8268$ | $d_2 = $ (Variable) | | |
| $r_3 = 126.1705$ | $d_3 = 0.8000$ | $n_{d2} = 1.60311$ | $\nu_{d2} = 60.70$ |
| $r_4 = 4.0366$ | $d_4 = 2.2300$ | | |
| $r_5 = 44.6457$(Aspheric) | $d_5 = 2.0000$ | $n_{d3} = 1.80518$ | $\nu_{d3} = 25.43$ |
| $r_6 = -71.0142$(Aspheric) | $d_6 = $ (Variable) | | |
| $r_7 = \infty$ (Stop) | $d_7 = $ (Variable) | | |
| $r_8 = 5.8837$(Aspheric) | $d_8 = 3.2000$ | $n_{d4} = 1.58913$ | $\nu_{d4} = 61.18$ |
| $r_9 = -718.6978$ | $d_9 = 0.1500$ | | |
| $r_{10} = 18.6867$ | $d_{10} = 0.8000$ | $n_{d5} = 1.84666$ | $\nu_{d5} = 23.78$ |
| $r_{11} = 6.4821$ | $d_{11} = 0.7400$ | | |
| $r_{12} = 15.7129$ | $d_{12} = 2.4000$ | $n_{d6} = 1.71300$ | $\nu_{d6} = 53.84$ |
| $r_{13} = -16.5051$(Aspheric) | $d_{13} = $ (Variable) | | |
| $r_{14} = \infty$ | $d_{14} = 3.2222$ | $n_{d7} = 1.51633$ | $\nu_{d7} = 64.15$ |
| $r_{15} = \infty$ | $d_{15} = 1.7778$ | $n_{d8} = 1.61700$ | $\nu_{d8} = 62.79$ |
| $r_{16} = \infty$ | $d_{16} = 1.1111$ | | |
| $r_{17} = \infty$ | $d_{17} = 0.8333$ | $n_{d9} = 1.51633$ | $\nu_{d9} = 64.15$ |
| $r_{18} = \infty$ | | | |

Zooming Spaces

| | | | |
|---|---|---|---|
| f | 5.150 | 8.770 | 14.935 |
| $d_2$ | 1.300 | 7.332 | 9.565 |
| $d_6$ | 9.465 | 3.434 | 1.200 |
| $d_7$ | 7.293 | 5.161 | 1.200 |
| $d_{13}$ | 1.200 | 3.332 | 7.293 |

Amount of Movement of Second Group for Focusing

| | | | |
|---|---|---|---|
| f | 5.150 | 8.770 | 14.935 |
| | 0.476 | 0.599 | 0.675 |

Aspherical Coefficients

5th surface $A_4 = 0.45296 \times 10^{-4}$
$A_6 = 0.43909 \times 10^{-4}$
$A_8 = -0.79255 \times 10^{-6}$
$A_{10} = -0.22060 \times 10^{-6}$
$A_{12} = 0.69472 \times 10^{-8}$ 6th surface $A_4 = -0.66357 \times 10^{-3}$
$A_6 = 0.35954 \times 10^{-4}$
$A_8 = -0.48206 \times 10^{-5}$
$A_{10} = 0.38377 \times 10^{-7}$
$A_{12} = -0.23361 \times 10^{-8}$ 8th surface $A_4 = -0.49150 \times 10^{-3}$
$A_6 = 0.16175 \times 10^{-5}$
$A_8 = -0.11428 \times 10^{-5}$
$A_{10} = 0.63379 \times 10^{-7}$
$A_{12} = -0.16730 \times 10^{-8}$ 13th surface $A_4 = 0.25135 \times 10^{-3}$
$A_6 = 0.21960 \times 10^{-4}$
$A_8 = -0.10696 \times 10^{-5}$
$A_{10} = 0.11723 \times 10^{-8}$
$A_{12} = 0.32604 \times 10^{-8}$ -continued

Example 3
f = 5.150 ~ 8.770 ~ 14.935
$F_{NO}$ = 2.87 ~ 3.34 ~ 4.87
2ω = 62.9° ~ 39.5° ~ 23.8°

| | | | |
|---|---|---|---|
| $r_1$ = 37.0217 | $d_1$ = 2.2000 | $n_{d1}$ = 1.48749 | $v_{d1}$ = 70.21 |
| $r_2$ = −156.1195 | $d_2$ = (Variable) | | |
| $r_3$ = −89.3465 | $d_3$ = 0.8000 | $n_{d2}$ = 1.60311 | $v_{d2}$ = 60.70 |
| $r_4$ = 4.1868 | $d_4$ = 1.8500 | | |
| $r_5$ = 39.7462 | $d_5$ = 2.3000 | $n_{d3}$ = 1.80518 | $v_{d3}$ = 25.43 |
| $r_6$ = −63.5644(Aspheric) | $d_6$ = (Variable) | | |
| $r_7$ = ∞ (Stop) | $d_7$ = (Variable) | | |
| $r_8$ = 5.9306(Aspheric) | $d_8$ = 3.4000 | $n_{d4}$ = 1.58913 | $v_{d4}$ = 61.18 |
| $r_9$ = −112.8018 | $d_9$ = 0.1500 | | |
| $r_{10}$ = 18.5867 | $d_{10}$ = 0.8000 | $n_{d5}$ = 1.84666 | $v_{d5}$ = 23.78 |
| $r_{11}$ = 6.3746 | $d_{11}$ = 1.0000 | | |
| $r_{12}$ = 19.2246(Aspheric) | $d_{12}$ = 2.3000 | $n_{d6}$ = 1.71300 | $v_{d6}$ = 53.84 |
| $r_{13}$ = −14.3982 | $d_{13}$ = (Variable) | | |
| $r_{14}$ = ∞ | $d_{14}$ = 3.2222 | $n_{d7}$ = 1.51633 | $v_{d7}$ = 64.15 |
| $r_{15}$ = ∞ | $d_{14}$ = 1.7778 | $n_{d8}$ = 1.61700 | $v_{d8}$ = 62.79 |
| $r_{16}$ = ∞ | $d_{15}$ = 1.1111 | | |
| $r_{17}$ = ∞ | $d_{16}$ = 0.8333 | $n_{d9}$ = 1.51633 | $v_{d9}$ = 64.15 |
| $r_{18}$ = ∞ | | | |

Zooming Spaces

| f | 5.150 | 8.770 | 14.935 |
|---|---|---|---|
| $d_2$ | 1.950 | 7.698 | 9.454 |
| $d_6$ | 8.704 | 2.956 | 1.200 |
| $d_7$ | 7.820 | 5.531 | 1.200 |
| $d_{13}$ | 1.200 | 3.490 | 7.820 |

Amount of Movement of Second Group for Focusing

| f | 5.150 | 8.770 | 14.935 |
|---|---|---|---|
| | 0.440 | 0.548 | 0.589 |

Aspherical Coefficients

6th surface $A_4$ = −0.63564 × $10^{-3}$
$A_6$ = −0.19176 × $10^{-4}$
$A_8$ = −0.10436 × $10^{-5}$
$A_{10}$ = 0.71398 × $10^{-7}$
$A_{12}$ = −0.51862 × $10^{-8}$ 8th surface $A_4$ = −0.45470 × $10^{-3}$
$A_6$ = −0.82785 × $10^{-5}$
$A_8$ = −0.62444 × $10^{-6}$
$A_{10}$ = 0.76006 × $10^{-7}$
$A_{12}$ = −0.26280 × $10^{-8}$ 12th surface $A_4$ = −0.25873 × $10^{-3}$
$A_6$ = −0.17026 × $10^{-4}$
$A_8$ = 0.22742 × $10^{-5}$
$A_{10}$ = −0.19309 × $10^{-6}$
$A_{12}$ = 0.32543 × $10^{-8}$

Example 4
f = 5.150 ~ 8.770 ~ 14.935
$F_{NO}$ = 2.83 ~ 3.34 ~ 4.85
2ω = 62.9° ~ 39.5° ~ 23.8°

| | | | |
|---|---|---|---|
| $r_1$ = 25.9304 | $d_1$ = 3.1000 | $n_{d1}$ = 1.48749 | $v_{d1}$ = 70.21 |
| $r_2$ = −59.3182 | $d_2$ = (Variable) | | |
| $r_3$ = −80.7394 | $d_3$ = 0.8000 | $n_{d2}$ = 1.83400 | $v_{d2}$ = 37.17 |
| $r_4$ = 4.9178 | $d_4$ = 1.8000 | | |
| $r_5$ = −8.6827 | $d_5$ = 0.8000 | $n_{d3}$ = 1.60311 | $v_{d3}$ = 60.70 |
| $r_6$ = 6.3033 | $d_6$ = 2.8000 | $n_{d4}$ = 1.83400 | $v_{d4}$ = 37.17 |
| $r_7$ = −16.4736 | $d_7$ = (Variable) | | |
| $r_8$ = ∞ (Stop) | $d_8$ = (Variable) | | |
| $r_9$ = 5.5808(Aspheric) | $d_9$ = 3.9000 | $n_{d5}$ = 1.67790 | $v_{d5}$ = 55.33 |
| $r_{10}$ = −98.0868 | $d_{10}$ = 0.1500 | | |
| $r_{11}$ = 70.8963 | $d_{11}$ = 0.8000 | $n_{d6}$ = 1.78470 | $v_{d6}$ = 26.30 |
| $r_{12}$ = 5.2252 | $d_{12}$ = 0.8000 | | |
| $r_{13}$ = 9.5650(Aspheric) | $d_{13}$ = 2.3000 | $n_{d7}$ = 1.58913 | $v_{d7}$ = 61.18 |
| $r_{14}$ = −14.9231 | $d_{14}$ = (Variable) | | |

-continued

| | | | |
|---|---|---|---|
| $r_{15} = \infty$ | $d_{15} = 3.2222$ | $n_{d8} = 1.51633$ | $\nu_{d8} = 64.15$ |
| $r_{16} = \infty$ | $d_{16} = 1.7778$ | $n_{d9} = 1.61700$ | $\nu_{d9} = 62.79$ |
| $r_{17} = \infty$ | $d_{17} = 1.1111$ | | |
| $r_{18} = \infty$ | $d_{18} = 0.8333$ | $n_{d10} = 1.51633$ | $\nu_{d10} = 64.15$ |
| $r_{19} = \infty$ | | | |

Zooming Spaces

| | | | |
|---|---|---|---|
| f | 5.150 | 8.770 | 14.935 |
| $d_2$ | 1.500 | 6.170 | 7.807 |
| $d_7$ | 7.507 | 2.837 | 1.200 |
| $d_8$ | 7.489 | 5.381 | 1.200 |
| $d_{14}$ | 1.200 | 3.308 | 7.489 |

Amount of Movement of Second Group for Focusing

| | | | |
|---|---|---|---|
| f | 5.150 | 8.770 | 14.935 |
| | 0.380 | 0.544 | 0.628 |

Aspherical Coefficients

9th surface $A_4 = -0.43284 \times 10^{-3}$
$A_6 = -0.37824 \times 10^{-5}$
$A_8 = -0.85039 \times 10^{-7}$
$A_{10} = -0.40226 \times 10^{-7}$
$A_{12} = 0.11806 \times 10^{-8}$ 13th surface $A_4 = -0.61268 \times 10^{-3}$
$A_6 = 0.10595 \times 10^{-3}$
$A_8 = -0.38942 \times 10^{-4}$
$A_{10} = 0.46817 \times 10^{-5}$
$A_{12} = -0.20025 \times 10^{-6}$ Example 5
f = 5.150 ~ 8.770 ~ 14.935
$F_{NO}$ = 2.87 ~ 3.34 ~ 4.87
2ω = 62.9° ~ 39.5° ~ 23.8°

| | | | |
|---|---|---|---|
| $r_1 = 53.9603$ | $d_1 = 2.0000$ | $n_{d1} = 1.48749$ | $\nu_{d1} = 70.21$ |
| $r_2 = -146.8805$ | $d_2 = $ (Variable) | | |
| $r_3 = -415.1791$ | $d_3 = 0.8000$ | $n_{d2} = 1.60311$ | $\nu_{d2} = 60.70$ |
| $r_4 = 4.5100$ | $d_4 = 1.8000$ | | |
| $r_5 = 16.8405$ | $d_5 = 2.1000$ | $n_{d3} = 1.80518$ | $\nu_{d3} = 25.43$ |
| $r_6 = 55.2922$(Aspheric) | $d_6 = $ (Variable) | | |
| $r_7 = \infty$ (Stop) | $d_7 = $ (Variable) | | |
| $r_8 = 5.9721$(Aspheric) | $d_8 = 3.3000$ | $n_{d4} = 1.58913$ | $\nu_{d4} = 61.18$ |
| $r_9 = -46.8380$ | $d_9 = 0.1500$ | | |
| $r_{10} = 13.2668$ | $d_{10} = 0.8000$ | $n_{d5} = 1.84666$ | $\nu_{d5} = 23.78$ |
| $r_{11} = 5.5478$ | $d_{11} = 1.1000$ | | |
| $r_{12} = 22.5379$ | $d_{12} = 2.3000$ | $n_{d6} = 1.71300$ | $\nu_{d6} = 53.84$ |
| $r_{13} = -14.4316$ | $d_{13} = $ (Variable) | | |
| $r_{14} = \infty$ | $d_{14} = 3.2222$ | $n_{d7} = 1.51633$ | $\nu_{d7} = 64.15$ |
| $r_{15} = \infty$ | $d_{15} = 1.7778$ | $n_{d8} = 1.61700$ | $\nu_{d8} = 62.79$ |
| $r_{16} = \infty$ | $d_{16} = 1.1111$ | | |
| $r_{17} = \infty$ | $d_{17} = 0.8333$ | $n_{d9} = 1.51633$ | $\nu_{d9} = 64.15$ |
| $r_{18} = \infty$ | | | |

Zooming Spaces

| | | | |
|---|---|---|---|
| f | 5.150 | 8.770 | 14.935 |
| $d_2$ | 1.500 | 8.065 | 10.270 |
| $d_6$ | 9.970 | 3.405 | 1.200 |
| $d_7$ | 7.590 | 5.335 | 1.200 |
| $d_{13}$ | 1.200 | 3.455 | 7.590 |

Amount of Movement of Second Group for Focusing

| | | | |
|---|---|---|---|
| f | 5.150 | 8.770 | 14.935 |
| | 0.501 | 0.595 | 0.633 |

Aspherical Coefficients

6th surface $A_4 = -0.57015 \times 10^{-3}$
$A_6 = -0.22168 \times 10^{-4}$
$A_8 = 0.21662 \times 10^{-5}$
$A_{10} = -0.24455 \times 10^{-6}$ $A_{12} = 0.55662 \times 10^{-8}$ 8th surface $A_4 = -0.60570 \times 10^{-3}$
$A_6 = -0.10427 \times 10^{-4}$
$A_8 = -0.60355 \times 10^{-6}$
$A_{10} = 0.11678 \times 10^{-6}$
$A_{12} = -0.50114 \times 10^{-8}$ Example 6
$f = 5.150 \sim 8.770 \sim 14.935$
$F_{NO} = 2.87 \sim 3.34 \sim 4.87$
$2\omega = 62.9° \sim 39.5° \sim 23.8°$

| | | | |
|---|---|---|---|
| $r_1 = 22.9641$ | $d_1 = 2.4000$ | $n_{d1} = 1.48749$ | $\nu_{d1} = 70.21$ |
| $r_2 = 130.1172$ | $d_2 =$ (Variable) | | |
| $r_3 = -429.8425$ | $d_3 = 0.8000$ | $n_{d2} = 1.60311$ | $\nu_{d2} = 60.70$ |
| $r_4 = 3.7788$ | $d_4 = 1.9000$ | | |
| $r_5 = 63.8413$(Aspheric) | $d_5 = 2.0000$ | $n_{d3} = 1.80518$ | $\nu_{d3} = 25.43$ |
| $r_6 = -40.8753$(Aspheric) | $d_6 =$ (Variable) | | |
| $r_7 = \infty$ (Stop) | $d_7 =$ (Variable) | | |
| $r_8 = 6.1854$(Aspheric) | $d_8 = 3.9000$ | $n_{d4} = 1.58913$ | $\nu_{d4} = 61.18$ |
| $r_9 = -74.9799$ | $d_9 = 0.1500$ | | |
| $r_{10} = 22.5208$ | $d_{10} = 0.8000$ | $n_{d5} = 1.84666$ | $\nu_{d5} = 23.78$ |
| $r_{11} = 6.7746$ | $d_{11} = 1.0000$ | | |
| $r_{12} = 15.5782$(Aspheric) | $d_{12} = 2.3000$ | $n_{d6} = 1.71300$ | $\nu_{d6} = 53.84$ |
| $r_{13} = -15.4210$ | $d_{13} =$ (Variable) | | |
| $r_{14} = \infty$ | $d_{14} = 3.2222$ | $n_{d7} = 1.51633$ | $\nu_{d7} = 64.15$ |
| $r_{15} = \infty$ | $d_{15} = 1.7778$ | $n_{d8} = 1.61700$ | $\nu_{d8} = 62.79$ |
| $r_{16} = \infty$ | $d_{16} = 1.1111$ | | |
| $r_{17} = \infty$ | $d_{17} = 0.8333$ | $n_{d9} = 1.51633$ | $\nu_{d9} = 64.15$ |
| $r_{18} = \infty$ | | | |

Zooming Spaces

| | | | |
|---|---|---|---|
| f | 5.150 | 8.770 | 14.935 |
| $d_2$ | 2.400 | 7.627 | 8.890 |
| $d_6$ | 7.690 | 2.463 | 1.200 |
| $d_7$ | 8.132 | 5.775 | 1.200 |
| $d_{13}$ | 1.200 | 3.557 | 8.132 |

Amount of Movement of Second Group for Focusing

| | | | |
|---|---|---|---|
| f | 5.150 | 8.770 | 14.935 |
| | 0.402 | 0.505 | 0.535 |

Aspherical Coefficients

5th surface $A_4 = 0.35180 \times 10^{-4}$
$A_6 = 0.48223 \times 10^{-4}$
$A_8 = -0.24581 \times 10^{-5}$
$A_{10} = -0.85903 \times 10^{-7}$
$A_{12} = -0.27065 \times 10^{-8}$ 6th surface $A_4 = -0.83375 \times 10^{-3}$
$A_6 = 0.24997 \times 10^{-4}$
$A_8 = -0.53112 \times 10^{-5}$
$A_{10} = -0.16520 \times 10^{-7}$
$A_{12} = -0.45693 \times 10^{-8}$ 8th surface $A_4 = -0.44694 \times 10^{-3}$
$A_6 = 0.20103 \times 10^{-5}$
$A_8 = -0.12654 \times 10^{-5}$
$A_{10} = 0.70664 \times 10^{-7}$
$A_{12} = -0.16197 \times 10^{-8}$ 12th surface $A_4 = -0.24111 \times 10^{-3}$
$A_6 = -0.22362 \times 10^{-4}$
$A_8 = 0.24000 \times 10^{-5}$
$A_{10} = -0.14152 \times 10^{-6}$
$A_{12} = 0.24852 \times 10^{-8}$ Set out below are the values of Conds. (1) to (9) in Examples 1 to 6. For calculation, the nearby object point is assumed to be spaced 300 mm away from the first surface of the lens system.

|     | EX. 1   | EX. 2   | Ex. 3   | Ex. 4   | Ex. 5   | Ex. 6   |
| --- | ------- | ------- | ------- | ------- | ------- | ------- |
| (1) | 0.9491  | 0.9475  | 0.9550  | 0.9417  | 0.9603  | 0.9544  |
| (2) | 0.2913  | 0.2524  | 0.3786  | 0.2913  | 0.2913  | 0.4660  |
| (3) | 0.7016  | 0.7245  | 0.7470  | 0.6501  | 0.7915  | 0.7514  |
| (4) | 1.4687  | 1.6049  | 1.4571  | 1.2247  | 1.7029  | 1.2602  |
| (5) | 0.8235  | 0.8325  | 0.8473  | 0.7714  | 0.8705  | 0.8524  |
| (6) | −0.261  | −0.223  | −0.223  | −0.367  | −0.177  | −0.230  |
| (7) | −0.2808 | −0.9838 | −0.9001 | −0.8923 | −0.7738 | −0.8476 |
| (8) | 1.6423  | 2.0622  | 2.0440  | 1.1591  | 2.4374  | 1.8605  |
| (9) | 0.4660  | 0.6214  | 0.6602  | 0.7573  | 0.6408  | 0.7573  |

The present zoom lens system as above explained may be used as an objective Ob of a video camera, as schematically shown in FIG. 7. In FIG. 7, a solid-state image sensor made up of CCDs, etc., in the form of a projecting means is located on the image-forming surface of the objective Ob for the purpose of focusing. Image signals converted by the solid-state image pickup sensor are electrically processed through a processor means into signals which can be displayed on a liquid crystal display device or otherwise recorded on a recording medium such as a magnetic tape. Sound signals concurrently obtained through a microphone are again electrically processed through such a processor means into signals which can be recorded on the recording medium. It is here noted that the liquid crystal display device is referred to for the purpose of illustration alone, and so other image display means such as CRTs may be used as well.

As can be understood from the foregoing, the present invention provides a zoom lens system comprising three groups or a positive, a negative or a positive, wherein the third group bears a chief part of zooming action and the second group is movable on the optical axis for rear focusing, so that the position of the entrance pupil can become shallow. Thus, it is possible to achieve a zoom lens system which has a zoom ratio of about 3, an F-number of about 2.0 to about 2.8 at the wide-angle end and a field angle as wide as about 60°, includes a front lens of reduced diameter, is suitable for use on still cameras, and is excellent in the ability to form images. This rear focusing zoom lens system is much more improved in the ability to form images by designing the shape or configuration of the third group.

What we claim is:

1. A compact rear focusing zoom lens system which comprises, in order from an object side of said system:
   a first group having positive refracting power, a second group having negative refracting power, a third group having positive refracting power,
   at least said second group moving along an optical axis of said system while said third group moves toward the object side of said system for zooming from a wide-angle end towards a telephoto end of said system,
   said second group moving and said first and said third groups remaining fixed for focusing from an object point at infinity to a nearby object point, and
   said third group consisting of up to four lenses, including at least one negative meniscus lens, and which conforms to the following conditions (1), (2), (3), and (4):

$$0.8 < 2^{\gamma}N/2^{\gamma}INF < 1.0 \quad (1)$$

$$0.25 < D_{12W}/f_W < 0.5 \quad (2)$$

$$0.4 < L_W/L_T < 1.0 \quad (3)$$

$$1.0 < (D_{12T} - D_{12W})/f_W 1.9 \quad (4)$$

where $2^{\gamma}N$ is the magnification ratio of the second group upon focusing on the nearby object point when zooming from the wide angle end to the telephoto end, $2^{\gamma}INF$ the magnification ratio of the second group upon focusing on the object point at infinity when zooming from the wide angle end to the telephoto end, $D_{12W}$ is a distance along the optical axis between the first and second groups at the wide-angle end upon focusing on the object point at infinity, $f_W$ is a focal length of the overall system at the wide-angle end upon focusing on the object point at infinity, $L_W$ and $L_T$ are amounts of movement of the second group at the wide-angle end and the telephoto end, respectively, upon focusing from one object point onto another object point, and $D_{12T}$ is a distance along the optical axis between the first and second group at the telephoto end upon focusing on the object point at infinity.

2. The compact rear focusing zoom lens system of claim 1, wherein the third group consists of only three lenses including a negative meniscus lens.

3. The compact rear focusing zoom lens system of claim 1, wherein the first group consists of one positive lens alone.

4. The compact rear focusing zoom lens system of claim 2, wherein the third group consists only of, in order from the object side thereof, a positive lens, a negative meniscus lens, and another lens.

5. The compact rear focusing zoom lens system of claim 2 or 4, wherein the negative meniscus lens located in the third group is shaped such that a concave surface thereof is directed towards an image side of said system.

6. The compact rear focusing zoom lens system of claim 1, wherein the second group consists of two lens components.

7. The compact rear focusing zoom lens system of claim 6, wherein the two lens components comprise a single lens, and a cemented lens.

8. The compact rear focusing zoom lens system of claim 7, wherein said single lens is a negative lens, and said cemented lens comprises a negative lens element and a positive lens element.

9. The compact rear focusing zoom lens system of claim 6, wherein the second group consists of a negative single lens, and a positive single lens.

10. The compact rear focusing zoom lens system as recited in claims 1, 2, 3, 4, or 6, characterized in that the following conditions (5) and (6) are satisfied:

$$0.6 < \beta_{3T}/(\beta_{3W}\gamma) < 0.95 \quad (5)$$

$$-0.4 < \beta_{2T} < -0.14 \quad (6)$$

where $\beta_{3T}$ is the magnification of the third group at the telephoto end upon focusing on an object point at infinity, $\beta_{3W}$ is the magnification of the third group at the wide-angle end upon focusing on an object point at infinity, $\gamma$ is the variable power ratio of the overall system, and $\beta_{2T}$ is the magnification of the second group at the telephoto end upon focusing on an object point at infinity.

11. The compact rear focusing zoom lens system as recited in claim 1 or 2, wherein the third group includes a positive lens closest to the object side having an aspheric surface while among the negative lenses contained in the third group, the negative lens closest to the image side is a meniscus lens concave on the image side, and the following conditions (7), (8) and (9) are satisfied:

$$-1.5 < (r_{31} + r_{32})/(r_{31} - r_{32}) < -0.2 \quad (7)$$

$$1.1 < (r_{33}+r_{34})/(r_{33}-r_{34}) < 4.0 \qquad (8)$$

$$0.46 < t_{31}/f_W < 1.2 \qquad (9)$$

where $r_{31}$ and $r_{32}$ are the radii of curvature of the respective lens surfaces, on the object and image sides, of the positive lens contained in the third group, which is closest to the object side, $r_{33}$ and $r_{34}$ are the radii of curvature of the respective lens surfaces, on the object and image sides, of the negative lens contained in the third group, which is closest to the image side, and $t_{31}$ is the thickness, on the optical axis, of the positive lens contained in the third group, which is closest to the object side.

* * * * *